US006496751B1

(12) United States Patent
Salvo et al.

(10) Patent No.: US 6,496,751 B1
(45) Date of Patent: Dec. 17, 2002

(54) MACHINE MANAGEMENT SYSTEMS AND MONITORING METHODS

(75) Inventors: Joseph James Salvo, Schenectady, NY (US); Patricia Denise Mackenzie, Clifton Park, NY (US); Thomas Anthony Morelli, II, Stephentown, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/464,872

(22) Filed: Dec. 16, 1999

(51) Int. Cl.$^7$ ............................................... G06F 19/00
(52) U.S. Cl. ......................... 700/196; 700/96; 700/174
(58) Field of Search ......................... 700/196, 197, 700/202–205, 180, 96, 108, 109, 169, 159, 174; 702/188

(56) References Cited

U.S. PATENT DOCUMENTS

| | | | |
|---|---|---|---|
| 4,437,046 A | | 3/1984 | Faillace ...................... 318/571 |
| 4,514,812 A | * | 4/1985 | Miller et al. ................ 264/40.1 |
| 5,062,052 A | | 10/1991 | Sparer et al. ................ 700/197 |
| 5,077,656 A | | 12/1991 | Waldron et al. ............. 710/305 |
| 5,291,416 A | * | 3/1994 | Hutchins ..................... 700/174 |
| 5,311,562 A | | 5/1994 | Palusamy et al. ........... 376/215 |
| 5,325,287 A | | 6/1994 | Spahr et al. .................. 700/17 |
| 5,472,651 A | * | 12/1995 | Peterson et al. ............ 264/40.6 |
| 5,912,678 A | * | 6/1999 | Saxena et al. ............... 700/103 |
| 5,974,434 A | * | 10/1999 | Rose ............................. 700/42 |
| 5,974,866 A | * | 11/1999 | Tjahjadi et al. .............. 425/115 |
| 6,141,647 A | * | 10/2000 | Meijer et al. ................ 700/100 |
| 6,311,101 B1 | * | 10/2001 | Kastner ......................... 700/17 |
| 6,341,271 B1 | * | 1/2002 | Salvo et al. ................... 705/28 |

FOREIGN PATENT DOCUMENTS

| | | |
|---|---|---|
| EP | 472169 A2 | 2/1992 |
| EP | 560263 A2 | 9/1993 |
| EP | 575150 A2 | 12/1993 |
| WO | 19782 | 4/1999 |

* cited by examiner

Primary Examiner—Leo Picard
Assistant Examiner—Paul Rodriguez
(74) Attorney, Agent, or Firm—Dougherty, Clements and Hofer; James J. Bindseil; Tracey R. Loughlin (57) ABSTRACT

A process management system for at least one of monitoring and controlling operation of a machine comprises at least one sensor assembly capable of being disposed on the machine for at least one of sensing, monitoring, and transmitting machine process variables of the machine, the at least one sensor assembly is capable of transmitting signals concerning the machine process variables; at least one machine operator control unit that is capable of receiving signals transmitted from the at least one sensor assembly, the at least one machine operator control unit being capable of generating information concerning machine process variables; at least one process management system control unit that is capable of being connected to the at least one machine operator control unit; at least one communications link that interconnects the at least one sensor assembly on the machine, the at least one machine operator control unit, and the at least one process management system control unit, each communications link capable of enabling the at least one process management system control unit to obtain the information concerning machine process variables. At least one of the process management system control unit and the machine operator control unit is capable of analyzing and evaluating machine process variables to control the operation of the machine. The invention also sets forth a method of monitoring.

75 Claims, 4 Drawing Sheets

MACHINE MANAGEMENT SYSTEMS AND MONITORING METHODS

BACKGROUND OF THE INVENTION

The invention relates to machine management systems and monitoring methods. In particular, the invention relates to process management systems and methods, for machines, manufacturing equipment, and other such systems.

Operations of process machinery are known to have been monitored for process variables, including raw material input, production output, and other process variables. For example, if a machine is an extruder, the raw material input and extruded production output can be monitored and measured. Also, machine process variables, including temperature of a melt unit, roller speed, roller pressure, and other process variables that may influence the extruder operation may be monitored and possibly measured. These process variables are recorded, sometimes automatically, to provide a historical record of the extruder's operation.

The process variable information typically has not been provided in an analyzed and evaluated form for enhancing process or machine operations. Any analyzing of process variable information is usually manual. This nature of analyzing is costly, time-consuming, and because of the type of analyzing, may lead to errors in the evaluation and analysis of the information. Thus, a need exists for a process and system that provides variable machine process information to the operator to enhance their operation.

SUMMARY OF THE INVENTION

A monitoring system for at least one of monitoring and controlling operation of a machine comprises at least one sensor assembly capable of being disposed on the machine for at least one of sensing, monitoring, and transmitting machine process variables of the machine, the at least one sensor assembly being capable of transmitting signals concerning the machine process variables; at least one machine operator control unit that is capable of receiving signals transmitted from the at least one sensor assembly, the at least one machine operator control unit being capable of generating information concerning machine process variables; at least one process management system control unit that is capable of being connected to the at least one machine operator control unit; at least one communications link that interconnects the at least one sensor assembly on the machine, the at least one machine operator control unit, and the at least one process management system control unit, each communications link capable of enabling the at least one process management system control unit to obtain the information concerning machine process variables. The at least one process management system control unit and the machine operator control unit are capable of analyzing and evaluating machine process variables to control the operation of the machine.

Another aspect of the invention sets forth a system for at least one of monitoring and controlling operation of a machine. The system includes sensor means that is disposed on the machine for at least one of sensing, monitoring, and transmitting machine process variables of the machine, the sensor means being capable of transmitting signals concerning the machine process variables; machine operator control means for receiving signals transmitted from the sensor means, the machine operator control means being capable of generating information concerning machine process variables; process management system control unit means for being connected to the machine operator process control unit means; communications link means for interconnecting the sensor means on the machine, the machine operator process control unit means, and the process management system control unit means, each communications link means enabling the control unit means to obtain the information concerning machine process variables. The control unit means and the machine operator process system control unit means is capable of analyzing and evaluating machine process variables to control the operation of the machine.

Also, the invention provides a method for monitoring and controlling operation of a machine. The method comprises disposing at least one sensor assembly on the machine; sensing, monitoring, and transmitting machine process variables of the machine; connecting each sensor assembly to a process control unit and a machine operator control unit; receiving signals transmitted from the at least one sensor assembly by at least one of the process control unit and the machine operator control unit; generating information concerning machine process variables by at least one of the process control unit and the machine operator control unit; and analyzing and evaluating machine process variables by at least one of the at least one process control unit and the machine operator control unit to control the operation of the machine.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

The process machinery monitoring and management systems and methods (hereinafter "process management system"), as embodied by the invention, monitor and record process machinery operational parameters, products produced, and other variable information, analyze and evaluate the process variable information, and provide this information for enhancing operations of the process machinery. The process variable information is analyzed and evaluated, for example using at least one of quality tools and methods, data monitoring tools and methods, process management tools and methods, and predictive engineering tools and methods (hereinafter referred to as "analytical tools"). The analytical tools and their associated methods include transfer functions and data mining algorithms for evaluating and analyzing the process variable information. The transfer functions and data mining algorithms interrelate the variable process information with each other and the analytical tools, and may provide process recommendations that can enhance the process and the machine operation.

The process management system is adapted to be operatively connected to a machine, for example at least one of an extruder, a roll former, injection molding machine, and other such machines and manufacturing systems. The following description of the process management system will refer to an extruder, however this machine is merely exemplary and is not meant to limit the invention in any way. In the description of the process management system, a "machine operator" means an entity that operates the machine, and a "management system operator" is an entity that operates the process management system that monitors, records, analyzes, evaluates, and provides process recommendations. Also, in the description of the process management system, the machine operator and management system operator will be discussed as separate entities, however this is merely exemplary, and is not meant to limit the invention in any way. The machine operator and the process management system operator can be the same entity, so the machine operator can monitor their own process machinery. With the process management system operator being the same entity as the machine operator, value can also be realized from the process management system. The management system operator can alternatively offer the process management system as a service tool to one or more process machine operators. Thus, the process management system owner can establish an alliance with its customers.

The process management system can be based on remote monitoring of processes, inventories, product and market information, raw material information, and key financial targets, when the process management system is used as a service product. Hardware for the process management system, such as sensor assemblies, computers, and data systems, and any process management system software, including but not limited to, transfer functions, data acquisition software, data mining software, and analysis software need not be visible to the machine operator. Accordingly, all but the results of the process management system can be invisible to the machine operator. The machine operator may simply use the process management system processed variable information to enhance operation of the process machinery and not be concerned with the process machinery monitoring and management systems and methods. Of course, if the machine operator is the same entity as the process machinery monitoring and management system and method owner, the results are owned by the same entity.

The process management system used as a service will be capable of providing remote monitoring and management of the machine and process and products. The term "capable" as used in this application means that the associated feature can, if properly used, accomplish, permit, or provide the disclosed property or function, even if not done. For example, and in no way limiting of the invention, the process management system can use communications links to connect the machine operator to the process management system owner. The communications links (to be described in further detail hereinafter) can provide real-time and near real-time analyzed and evaluated process variable information, in which the term "real-time" means that any delays from the time the process variable information is monitored, evaluated and analyzed, and then made available to the machine operator is minimal, for example on the order of minutes, and possibly a few seconds, or even longer if the need for the information is defined as such and the data may still be relevant and of value to the interested party, if any delay is present. Also, the term real time can mean a time required by a process management system user to obtain data.

The process management system may also provide an ability for at least one of the machine operator and process management system owner to interact and update, change or otherwise modify and control the evaluation and analytical operations of the process management system, in addition to the control of the process machine. Alternatively, and possibly in combination with the machine operator interacting with the process management system, the process management system operator may be able to interact with, and possibly control operations of the machine, in response to the evaluated and analyzed information. Thus, the process management system operator can control the operations of machines without the machine operator continuously monitoring the process machine. Further, the process management system may also provide an ability for others, such as, but not limited to, financial parties, regulatory agents, production personnel, or others connected to the process management system to gain access to the information, if desired.

This interaction may be beneficial to permit immediate control of the machine and to avoid the process machine's product or output from being something other than a desired product (also known as an "enhanced output" of the process machine). The term "enhanced output" means a product is produced meeting all necessary standards and requisites for the product using an efficient and desirable combination of process variables. For example, and in no way limiting of the machine, if the machine produces pipe, a desirable pipe has a constant wall thickness within a pipe wall thickness "t" plus or minus an allowable wall variance. If the process management system determines that the pipe wall thickness is lower than the pipe wall thickness "t" and outside of the allowable wall variance, the process management system may interact with the machine, either directly or through the machine operator (to be described hereinafter), to correct the pipe wall thickness, and avoid pipe that does not meet its standards. Similarly, if the wall of the pipe is being produced with a thickness that is greater than the pipe wall thickness "t" too much material is being used to make the pipe, and resources may be wasted. Accordingly, the process management system may interact with the machine to correct the pipe wall thickness and avoid waste of materials. Further, the process variables may influence one another in the machine process, so the process management system, as embodied by the invention, controls process variables so that they do not adversely influence other process variables.

The process management system 1, as embodied by the invention, will be described with reference to the figures. The process management system 1 comprises a process machine 10, for example an extruder, a roll former, injection molding machine, and other such machines. The following description of the process management system 1 will refer to an extruder as the process machine 10, however this is merely exemplary and is not meant to limit the invention in any way. The process machine 10 is schematically illustrated as one extruder, however the process machine, as embodied by the invention, may comprises one or more process machines.

The process management system 1 further comprises communications links 11 that connect at least one process variable sensor assembly 12 (often referred to as a "sensor module" of the process machine 10 to a process machine data module 13. Other communications links 11 connect components of the process management system 1 to one another as discussed hereinafter and as illustrated in the figures. The at least one process variable sensor assembly 12 measures at least one process variable of the process machine 10 and comprises communication connections to transmit the measured process variable through the communications link 11. The at least one process variable sensor assembly 12 comprises a suitable sensor assembly to determine the appropriate process variable (to be described hereinafter).

The communications links 11 described hereinafter, include, but are not limited to, at least one of a phone modem, network connection, hardwired connections, such as cables, connectors, dedicated phone lines, fiber-optic lines, and similar hardwired connections, wired and wireless Ethernet signals, short-wave signals, wired and wireless Internet and web signals, and other wireless connections radio communication and other wireless communication systems, cellular communication, satellite communication, web access communication, and Internet access communication, and combinations thereof. The above are merely exemplary and are not meant to limit the invention in any way. The communications links 11 can be provided to any entity or user that would like to view the information, in which the entity or user can employ any communications link within the scope of the invention, as described herein. The communications links 11 provide two-way communication from the machine to a connected entity, as described hereinafter. The two-way communication can be provided by any appropriate communication mode, for example, but not limited to email, radio, satellite, facsimile, hardwired communications, voice mail, alarms, mail, and combinations thereof.

The process machine data module 13 comprises a device that can collect, record, and store process variables communicated over the communications links 11, such as from a process variable sensor assembly 12. For example, and in no way limiting of the invention, the process machine data module 13 comprises at least one of a computer chip, microprocessor, programmed logic chip (PLC), embedded chip, analog/digital (AID) module and network module, an ASIC, and other such microprocessing units. The process machine data module 13 is capable of connection to and for receiving one or a plurality of communications links 11 from sensor assemblies 12 on the process machine 10.

The process management system 1 also comprises a machine operator control unit 15 that can be in communication with the process machine data module 13. The machine operator control unit 15 is in communication with the process machine data module 13 over communications link 11. The machine operator control unit 15 is also capable of being in communication over communications links 11 to a service center 20, a web site 30, a process management system control unit 40, a raw material data source unit 50, a raw material vendor source unit 60, and a market information source unit 70 (the interaction and details of which will be described hereinafter). The machine operator control unit 15 is in communication with the above features of the process management system 1 over at least one communications link 11.

The machine operator control unit 15 may also be able to provide a feedback capability for the machine operator to communicate with at least one of the process machine data module 13, service center 20, a web site 30, a process management system control unit 40, a raw material data source unit 50, a raw material vendor source unit 60, and a market information source unit 70. Thus, the machine operator is able to interact and provide feedback with features of the process management system 1.

The process management system 1 may further comprise a communications link 11 between each of the machine operator control unit 15 and process management system control unit 40 (hereinafter "control unit") and the raw material data source unit 50, the raw material vendor source unit 60, and the market information source unit 70. Accordingly, the process management system 1 provides direct raw material and market input, without delays that are typical with prior raw material information, such as information provided in written reports, market analysis, and the like.

The process machine 10 may transform, form, create, or manufacture a product. When the process machine 10 comprises an extruder, as in an exemplary form of a process machine 10, the extruder is provided with a raw material. The raw material is melted or undergoes other physical or chemical transformations, chemical reactions, or other changes into the product (hereinafter "transformations").

The process machine 10 generally forms the raw material into the product by a transformation that occurs within certain process variable ranges. The transformation of the raw material into the product is desirably conducted within preset process variable ranges, which enhance efficiency of the process machine's operations and product output. A change in one process variable outside of a preset process variable range may effect the transformation of the raw material into the product. Further, a change in one process variable outside of the preset process variable range may necessitate a change in one or more of the other process variables for the process machine 10. In some instances, a change in one process variable outside of the preset process variable range may cause the product produced by the process machine 10 to be undesirable in some manner, and may cause the product to be scrapped. Therefore, the process variables for the process machine 10 are monitored for compliance with the preset process variable ranges. The process variables are controlled within these certain ranges by the process management system 1 to enhance the efficiency of the process machine 10 and to increase the output of the process machine 10.

Figure 2:
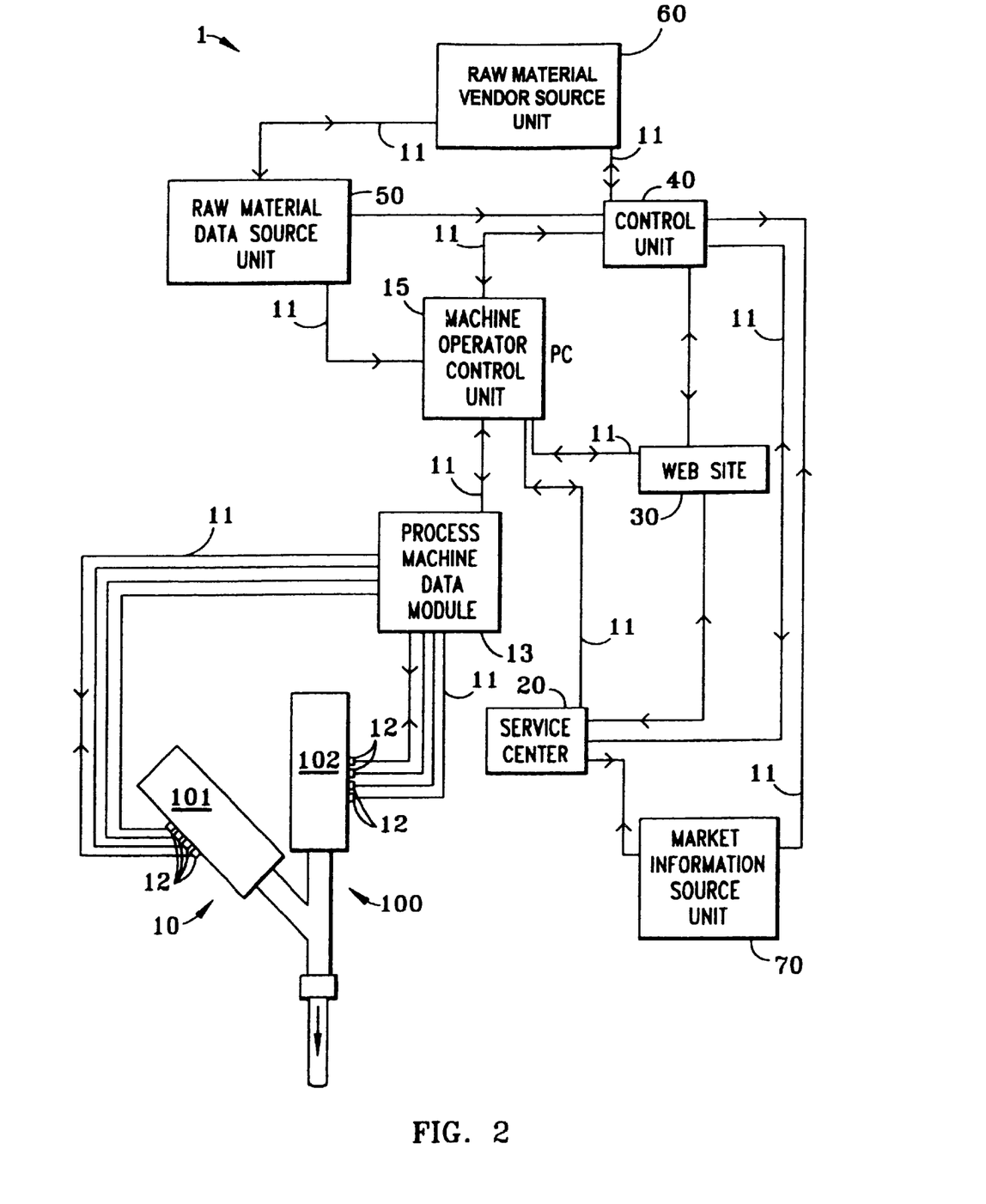
FIG. 2 is a schematic illustration of a process management system, as embodied by the invention, with an extruder.
Figure 3:
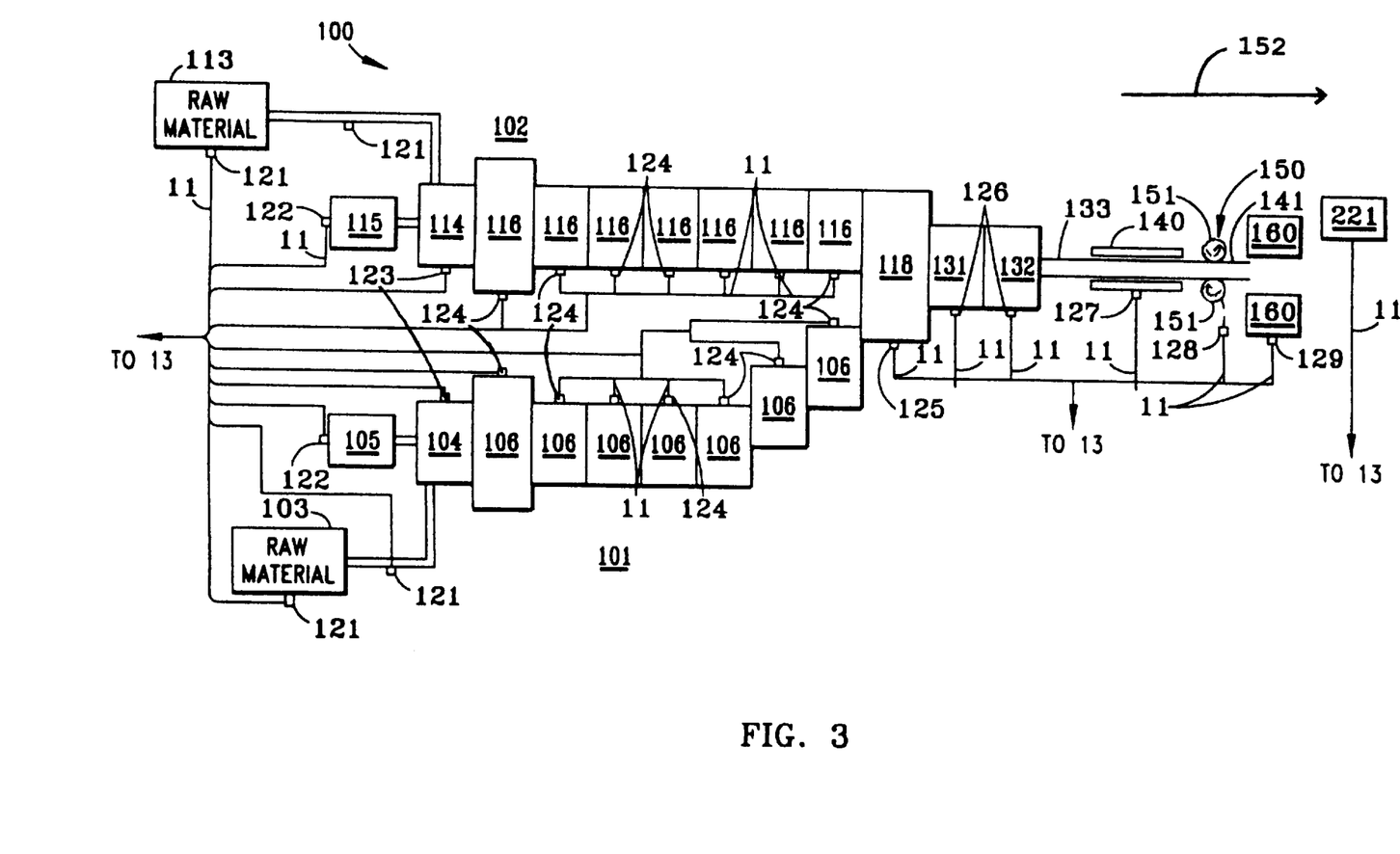
FIG. 3 is a schematic illustration of an extruder for a process management system, as embodied by the invention.

If the process machine 10 comprises an extruder, raw material can be formed into a product, such as, but not limited to, a pipe. FIGS. 2 and 3 schematically illustrate an extruder 100, as embodied by the invention. The extruder 100 can comprise, but is not limited to a skin-forming unit 101 and a foam-forming unit 102. For example, the extruder 100 may only include the foam-forming unit 102, and need not include the skin-forming unit. The following description will discuss an extruder 100 with both units, however, this is merely exemplary and is not intended to limit the invention in any manner. The skin-forming unit 101 is provided with raw material 103 that is fed to a receiving chamber 104. The raw material 103 is moved through the skin-forming unit 101 by a motive device 105 that drives an appropriate conveyance device, such as, but not limited to a screw conveyor (not illustrated). The motive device 105 may comprise any appropriate motive device whose speed is able to be controlled, including, but not limited to, a step motor, a direct drive motor, and similar such motors.

In FIG. 3, the raw material 103 is melted in the skin-forming unit 101 as it is moved from the receiving chamber 104 through individual units 106 of the skin-forming unit 101. The units 106 of the skin-forming unit 101 may comprise at least one unit that applies heat to melt the raw material 103, applies pressure, such as one of positive or negative pressure, on the raw material 103, or applies both pressure and heat to melt the raw material 103.

The foam-forming unit 102 is formed similar to the skin-forming unit 101. The foam-forming unit 102 is provided with raw material 113 that is fed to a receiving chamber 114. The raw material 113 is moved through the foam-forming unit 102 by a motive device 115 that drives an appropriate conveyance device, such as, but not limited to a screw conveyor (not illustrated). The motive device 115 may comprise any appropriate motive device whose speed is able to be controlled, including, but not limited to, a step motor, a direct drive motor, and similar such motors.

The raw material 113 is melted in the foam-forming unit 102 as it is moved from the receiving chamber 114 through individual units 116 of the foam-forming unit 102. The units 116 of the foam-forming unit 102 may comprise at least one unit that applies heat to melt the raw material 113, applies pressure, such as one of positive or negative pressure, on the raw material, or applies both pressure and heat to melt the raw material 113.

The foam-forming unit 102 and the skin-forming unit 101 are connected at a joining chamber 118. The joining chamber 118 receives raw material 103 and 113 from each of the foam-forming unit 102 and the skin-forming unit 101 and mixes the raw materials 103 and 113 together to form an intermediate product material. The joining chamber 118 can apply heat to the intermediate product material, can apply pressure, such as one of positive or negative pressure, to the intermediate product material, and can apply both heat and pressure to the intermediate product material.

The joining chamber 118 leads to general-shaping chambers/units 131 and 132. These general-shaping chambers/units 131 and 132 extrude an intermediate product material 133 with a general shape that is approximately similar to the final desired shape of the product. The general-shaping chambers/units 131 and 132 can apply heat to the intermediate product material, can apply pressure, such as one of positive or negative pressure, to the intermediate product material, and can apply both heat and pressure to the intermediate product material. For example, if the product is a pipe, the extruded general shape is that of a pipe, with dimensions of the intermediate product material 133 that are close to the desired dimensions of the final pipe. Alternatively, if the product comprises an intricate complex extruded article, such as a molding for windows, the general-shaping chambers/units 131 and 132 extrude an intermediate product material 133 with an approximate shape and dimensions that are close to those of the desired final product.

The general-shaping chambers/units 131 and 132 extrude the intermediate product material 133 to a final shaper unit 140, such as a cooling bath. The final shaper unit 140 can comprises a device that applies pressure, such as one of positive or negative pressure, to the intermediate product material 133 and forms the extruded final product 141 with its desired final shape, dimensions, and configuration. The final shaper unit 140 applies pressure to the extruded intermediate product material 133, and may apply or remove heat to assist in the formation of the extruded final product.

A roller assembly 150 or other final motive device, such as but not limited to a gripper device, moves the extruded final product 141 from the final shaper unit 140. The roller assembly 150 comprises at least one roller 151 for moving the extruded final product 141 from the extruder and possibly applying pressure for further forming of the product. As illustrated in FIG. 3, the roller assembly is illustrated with two rollers 151 that rotate so as to move the extruded final product 141 in the direction of arrow 152. The rollers 151 may be internally cooled, for example by coolant inside the rollers. The rollers 151 can cool (if the rollers 151 are cooled) the extruded final product so that it is more readily handled without adversely affecting the shape of the extruded final product 141 if it were still hot from the melting and pressure during the extrusion process. For example, water may be fed into the rollers 151 to cool the extruded final product 141.

Alternatively, a separate device 160 may be provided for cooling and/or cutting the extruded final product 141 when the extruded final product 141 exits the final shaper unit 140. The device 160 may comprise a blower, coolant sprayer, chiller unit, and similar unit that cools the extruded final product 141 for ease of handling, in combination with cutting means to provide a product of desired length. The separate cooling device may be provided in a process management system 1 without the rollers 151 being cooled or in combination with the rollers 151 being cooled, if the separate device 160 is a cooling device.

Figure 1:
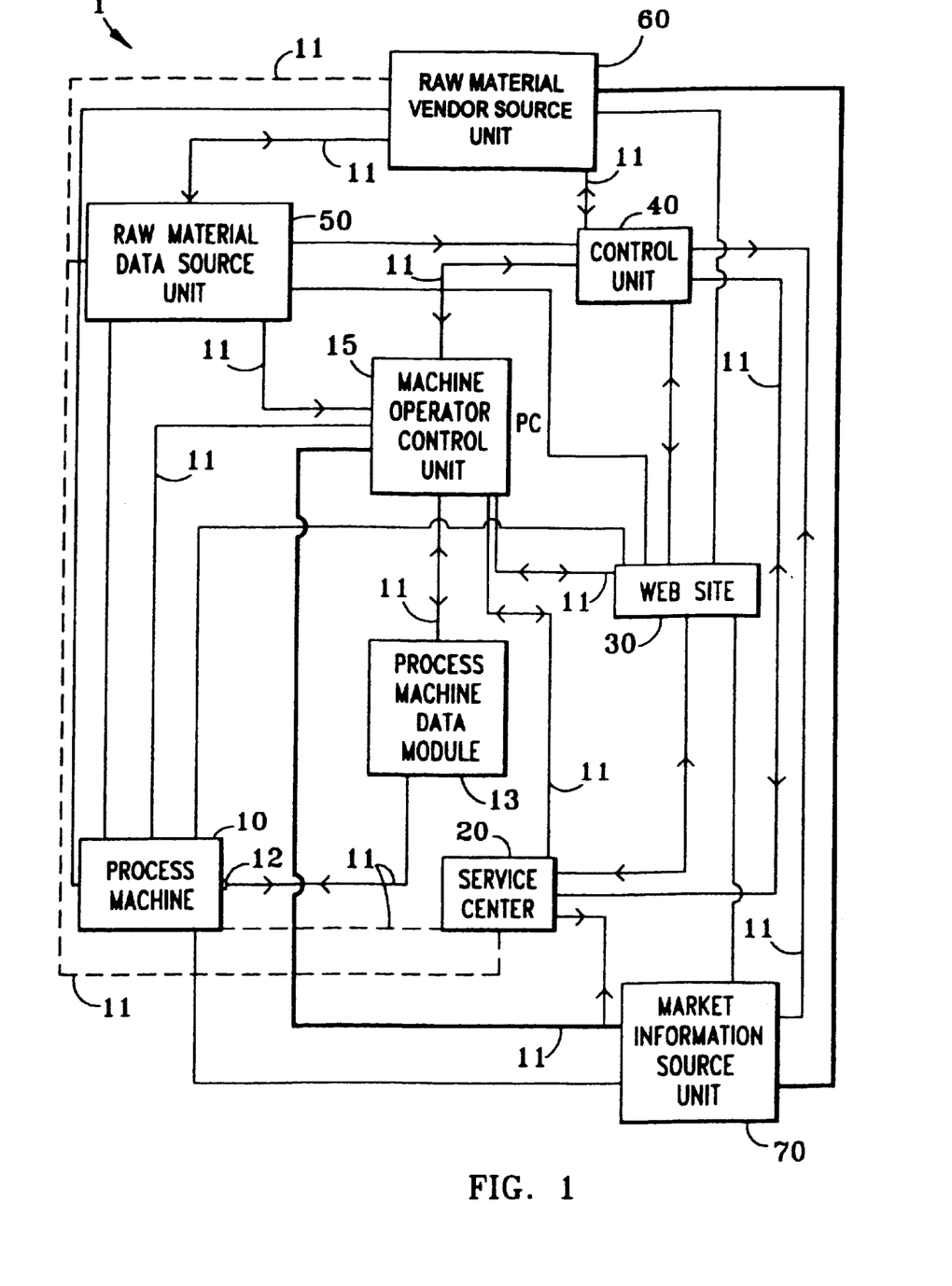
FIG. 1 is a schematic illustration of a process management system, as embodied by the invention.

Each of the components of the extruder 100 is provided with a sensor assembly 12 for the process management system 1 that is in communication with and connected to a communications link 11, as illustrated in FIG. 1. FIG. 3 illustrates one individual sensor assembly for each component of the extruder 100. While the figure illustrates an individual sensor assembly for each component, the configuration is merely exemplary and is not intended to limit the invention in any manner. The scope of the invention includes sensor assemblies only on some of the components of the extruder 100 so that monitoring of the process variables, as embodied by the invention, is possible.

The sensor assemblies 12 for the process management system 1 comprise raw material sensor assemblies 121 that monitor and measure amounts at least one of the raw materials provided to the skin-forming unit 101 and a foam-forming unit 102 and the rates of providing the raw materials. The raw material sensor assemblies 121 may comprise at least one sensor assembly for measuring variables such as weight, flow, and the like of raw materials 103 and 113, a flow sensor assembly for measuring the amounts of raw materials delivered to the skin-forming unit 101 and a foam-forming unit 102, and combinations thereof. The raw material sensor assemblies 121 may take any appropriate form that fulfills its functions.

The raw material sensor assemblies 121 may also comprise a sensor assembly that fulfills the above-discussed functions, along with a raw material amount controlling function. In this form of raw material sensor, the sensor assembly 121 can control the actual amount of raw material fed to each of the skin-forming unit 101 and a foam-forming unit 102. For example, if the sensor assembly 121 comprises a flow sensor, the controlling feature is accomplished by permitting the sensor assembly to control flow rates to each of the skin-forming unit 101 and foam-forming unit 102. In this exemplary scenario, the sensor assembly can comprise at least one of a flow sensor assembly that can determine how much raw material has passed to one of the skin-forming unit 101 and foam-forming unit 102, and adjust flow so a desired amount of raw material is provided. This controlling function can be automatically provided by at least one of the process management system 1, by the extruder 100 operator after being alerted by the process management system 1, and by the service center 20, as described hereinafter. Each sensor assembly 121 is connected to a communications link 11 that is in communication with the module 13 of the process management system 1.

The process management system 1 also includes sensor assemblies 122 that are in communication with and connected to the motive device 105 and 115. The sensor assemblies 122 measure at least one of the number of roller 151 rotations per unit time that are measured by sensor assembly 128, an energy draw of the motive device 105 and 115, and speed at which the raw materials are fed and processed by each of the skin-forming unit 101 and a foam-forming unit 102. Further, the sensor assemblies 122 can be configured within the scope of the invention for controlling the speed of the motive device 105 and 115, and thus controlling the speed of raw materials fed and processed by each of the skin-forming unit 101 and a foam-forming unit 102. This controlling function of the sensor assemblies 122 can also be automatically provided by at least one of the process management system 1, by the extruder 100 operator after being alerted by the process management system 1, and by the service center 20. Each sensor assembly 122 is connected to a communications link 11 that is in communication with the module 13 of the process management system 1.

The extruder 100 further comprises sensor assemblies 123 that are connected to the receiving chambers 104 and 114. The sensor assemblies 123 monitor and measure the amounts of raw materials that are fed to the receiving chambers 104 and 114.

The process management system 1 also includes sensor assembly 124 on one or more of the individual units 106 and 116. The sensor assembly 124 is in communication with the units 106 and 116 and monitors at least one of a temperature of the unit 106 and 116, heat applied, temperature of the raw material melt, and pressure applied or developed. Thus, the sensor assembly 124 can comprise a single multi-purpose sensor. Alternatively, the sensor assembly 124 comprises multiple sensor assemblies each of which can measure and monitor one or more of heat applied, temperature of the raw material melt, and pressure applied or developed.

The sensor assembly 124 may also be capable of controlling at least one of temperature of the unit 106 and 116, heat applied to the raw material and raw material melt, temperature of the raw material melt, and pressure applied or developed. For example, if the sensor assembly 124 comprises a thermostat, the controlling feature permits sensor assembly 124 to adjust the heat applied at unit 106 or 116. Further, if the sensor assembly 124 comprises a pressure-sensing device, the controlling feature may permit adjustment of the applied or developed pressure. This controlling function can be automatically provided by at least one of the process management system 1, the extruder 100 operator after being alerted by the process management system 1, and the service center 20, as described hereinafter. Each sensor assembly 124 is connected to a communications link 11 that is in communication with the module 13 of the process management system 1.

Also, the process management system 1 for an extruder 100 includes sensor assembly 125 that is in communication with the joining chamber 118. Thus, the sensor assembly 125 can comprise a single multi-purpose sensor. Alternatively, the sensor assembly 125 comprises multiple sensor assemblies each of which can measure and monitor one or more of heat applied, temperature of the raw material melt, and pressure applied or developed at the joining chamber 118.

The sensor assembly 125 may also be capable of controlling at least one of temperature of the unit 118, heat applied to the raw material and raw material melt, temperature of the raw material melt, and pressure applied or developed at the joining chamber 118. For example, if the sensor assembly 125 comprises a thermostat, the controlling feature permits sensor assembly 125 to adjust the heat applied at the joining chamber 118. Further, if the sensor assembly 125 comprises a pressure-sensing device, the controlling feature may permit adjustments of the applied or developed pressure at the joining chamber 118. This controlling function can be automatically provided by at least one of the process management system 1, the extruder 100 operator after being alerted by the process management system 1, and the service center 20, as described hereinafter. Each sensor assembly 125 is connected to a communications link 11 that is in communication with the module 13 of the process management system 1.

In an extruder 100 for a process management system 1, each general-shaping chamber/unit 131 or 132 also is provided with at least one sensor assembly 126. The sensor assembly 126 is in communication with the general-shaping chamber/unit 131 or 132 and monitors at least one of temperature of the chamber/unit 131 or 132, applied heat of the raw material melt, and pressure applied or developed. Thus, the sensor assembly 126 can comprise a single multi-purpose sensor. Alternatively, the sensor assembly 126 comprises multiple sensor assemblies each of which can measure and monitor one or more of heat applied, temperature of the raw material melt, and pressure applied or developed at the general-shaping chamber/unit 131 or 132.

The sensor assembly 126 may also be capable of controlling heat applied to the raw material and raw material melt, temperature of the raw material melt, and pressure applied or developed at the general-shaping chamber/unit 131 or 132. For example, if the sensor assembly 126 comprises a thermostat, the controlling feature permits sensor assembly 126 to adjust the heat applied at the general-shaping chamber/unit 131 or 132. Further, if the sensor assembly 126 comprises a pressure-sensing device, the controlling feature may permit adjustments of the applied or developed pressure at the general-shaping unit 131 or 132. This controlling function can be automatically provided by at least one of the process management system 1, the extruder 100 operator after being alerted by the process management system 1, and the service center 20, as described hereinafter. Each sensor assembly 126 is connected to a communications link 11 that is in communication with the module 13 of the process management system 1.

The final shaper unit 140 of the extruder 100 also comprises at least one sensor assembly 127. The sensor assembly 127 is in communication with the final shaper unit 140 and monitors at least one of temperature of the unit 140, heat applied or removed, temperature of the raw material melt, and pressure applied or developed at the final shaper unit 140. Thus, the sensor assembly 127 can comprise a single multi-purpose sensor. Alternatively, the sensor assembly 127 comprises multiple sensor assemblies each of which can measure and monitor one or more of heat applied or removed, temperature of the raw material melt, and pressure applied or developed at the final shaper unit 140.

The sensor assembly 127 may also be capable of controlling heat applied to or removed from the raw material and raw material melt, temperature of the raw material melt, and pressure applied or developed at the final shaper unit 140. For example, if the sensor assembly 127 comprises a thermostat, the controlling feature permits sensor assembly 127 to adjust the heat applied or removed at the final shaper unit 140. Further, if the sensor assembly 127 comprises a pressure-sensing device, the controlling feature may permit adjustments of the applied or developed pressure at the final shaper unit 140. This controlling function can be automatically provided by at least one of the process management system 1, the extruder 100 operator after being alerted by the process management system 1, and the service center 20, as described hereinafter. Each sensor assembly 127 is connected to a communications link 11 that is in communication with the module 13 of the process management system 1.

The roller assembly 150 is also provided with at least one sensor assembly 128. The sensor assembly 128 is in communication with the roller assembly 150 and monitors at least one of roller speed and thus speed of the product produced, heat applied or removed (if any heat is applied or removed at the roller assembly 150), temperature of the raw material melt, and pressure applied or developed at the roller assembly 150. Thus, the sensor assembly 128 can comprise a single multi-purpose sensor. Alternatively, the sensor assembly 128 comprises multiple sensor assemblies each of which can measure and monitor one or more of heat applied or removed, speed or number of rotations, temperature of the raw material melt, and pressure applied or developed at the roller assembly 150.

The sensor assembly 128 may also be capable of controlling heat applied to or removed from the raw material and raw material melt, temperature of the raw material melt, speed and number of rotations of a roller, and pressure applied or developed at roller assembly 150. This controlling function can be accomplished by each sensor assembly 128 being connected to a communications link 11 that is in communication with the module 13 of the process management system 1.

Further, the extruder 100 can be provided with at least one separate cooling device 160 that includes a sensor assembly 129. The sensor assembly 129 monitors at least one of cooling medium applied and temperature of the final extruded product, temperature, and flow rate of the cooling medium. Thus, the sensor assembly 129 can comprise a single multi-purpose sensor. Alternatively, the sensor assembly 129 comprises multiple sensor assemblies, each of which can measure and monitor process variables at the separate cooling device 160.

The sensor assembly 129 may also be capable of controlling process variables at the separate cooling device 160. For example, if the sensor assembly 129 comprises a thermostat, the controlling feature permits sensor assembly 129 to adjust the temperature or flow rate of the cooling medium applied at separate cooling device 160. This controlling function can be automatically provided by at least one of the process management system 1, the extruder 100 operator after being alerted by the process management system 1, and the service center 20, as described hereinafter. Each sensor assembly 129 is connected to a communications link 11 that is in communication with the module 13 of the process management system 1.

The process management system 1 is also provided with an additional final product sensor assembly 221 that is generally illustrated in FIG. 3. The final product sensor assembly 221 is connected to a communications link 11 that is in communication with the module 13 of the process management system 1. The final product sensor assembly 221 is used to measure, monitor, and determine physical and material characteristics of the final product of the process management system 1. For example, if the process machine comprises an extruder 100, such as but not limited to a pipe extruder, the final product sensor assembly 221 of the process management system 1 can measure at least one of the pipe thickness, the pipe's inner diameter, the pipe's outer diameter, the pipe's weight per unit length, the pipe's density, and various physical characteristics of the pipe including, but not limited to tensile strength, impact strength, yield stress, fracture stress, ovality, and strength-to-weight ratios. The above listing of final product characteristics that the final product sensor assembly 221 of the process management system 1 can measure is merely exemplary, and is not intended to limit the invention in any manner. For example, the sensor 221 can determine quality measures for the product. The scope of the invention includes the final product sensor assembly 221 being capable of measuring and monitoring other final product characteristics, as determined by the machine operator and the process management system operator.

The process machine process variable signals and the final product characteristic signals (hereinafter "process management system signals") from the various sensor assemblies 12, 121–129, and 221 are transmitted to process machine data module 13 via the communications links 11. The signals may be sent directly through the process machine data module 13 to the machine operator control unit 15, in which the process machine data module 13 acts merely as a conduit and does not interact with or delay the signals in any way. Accordingly, the signals are transmitted to the machine operator control unit 15.

Alternatively, the signals may be stored in the process machine data module 13 for a time period, after which they are transmitted to the machine operator control unit 15. Further, as another alternative, the signals may be stored and compiled in the process machine data module 13, and then transmitted to the machine operator control unit 15, wherein the transmission to the machine operator control unit 15 may occur with or without a time delay.

The transmission of the signals from the process machine data module 13 and machine operator control unit 15 to the control unit 40 is transmitted over communications links 11. The control unit 40 is programmed to operate, and alternatively comprises software for data acquisition, data mining, and analysis thereby enabling process analysis and decisions to be made. The control unit 40 alternatively can comprise an appropriate solid-state device that can collect process data, and evaluate and analyze the collected process data.

At least one of the machine operator control unit 15 and the control unit 40 is capable of being programmed to operate, and alternatively comprises, software for data acquisition, data mining, and analysis thereby enabling analysis and decisions to be made. The control unit 40 comprises any appropriate high-powered solid-state switching device. As illustrated, the control unit 40 can be a computer. However, this type of control unit 40 is merely exemplary of an appropriate high-powered control unit that is within the scope of the invention. For example but not limiting of the invention, the control unit 40 comprises at least one of a silicon controlled rectifier (SCR), a thyristor, MOS-controlled thyristor (MCT) and an insulated gate bipolar transistor. In the illustrated embodiment, the control unit 40 is implemented as a single special purpose integrated circuit, such as ASIC, having a main or central processor section for overall, system-level control, and separate sections dedicated to performing various different specific combinations, functions and other processes under control of the central processor section. It will be appreciated by those skilled in the art that the control unit 40 can also be implemented using a variety of separate dedicated or programmable integrated or other electronic circuits or devices, such as hardwired electronic or logic circuits including discrete element circuits or programmable logic devices, such as PLCs, PLDs, PALs, PLAs or the like. The control unit 40 can also be implemented using a suitably programmed general-purpose computer, such as a microprocessor or microcontrol, or other processor device, such as a CPU or MPU, either alone or in conjunction with one or more peripheral data and signal processing devices. A distributed processing architecture provides enhanced data/signal processing capability and speed.

At least one of the machine operator control unit 15 and the control unit 40 can include software for data acquisition, data mining, and data analysis. The software enables process analysis, as embodied by the invention. The software also enables manufacturing and process planning, predicting process planning, and process variable planning decisions to be made based on analyzed and evaluated information. At least one of the machine operator control unit 15 and the control unit 40 can be capable of recording, storing, and transmitting the machine process variables. The machine process operations can be recorded, sometimes automatically, and can provide a historical record of the extruder's operation.

At least one of the machine operator control unit 15 and the control unit 40 can include and develop transfer functions to analyze and evaluate the process variable and other process management system 1 information. The transfer functions include, but are not limited to, manufacturing transfer functions. The transfer functions typically are regression analysis operations that model machine operation based on production, process variables, and other process-related factors. The transfer functions enable individual features, such as, but not limited to, machines, of the process management system 1 to evaluate and analyze process variables so as to enhance process variables during the operation of the process machine.

A manufacturing transfer function, as embodied by the invention, relates process variables during production. The manufacturing transfer function may include process variable prediction analytical tools (hereinafter PVAT) that can relate process variables to each other and other process management system 1 information for production at a desired level of efficiency.

The PVATs develop transfer functions that analyze and evaluate the process management system 1 information. The PVATs may also include predictive analytical tools that enable the process management system 1 to predict estimated future process needs, costs, prices, and other operations based on process variables and process management system 1 information. The transfer functions are dependent on the process variables, the final product, and its desired specifications and raw materials. The control unit 40 can apply the PVATs to analyzed product and process variable information for development of transfer functions. These PVAT-developed transfer functions can be used to enhance production and development of the process management system 1, and can also modify themselves, if needed, as a result of past performance of the process management system 1. The PVAT-developed, modifying, transfer functions can be developed and updated through process variable analysis, product analysis information, critical to quality (CTQ) variables, and other process variables. For example, the PVAT-developed, modifying, transfer functions can be developed and modified through Design-Of-Experiments (DOEs), as known in the art.

A further process management system 1 benefit arises from at least one of the machine operator control unit 15, the control unit 40, and the service center 20 applying quality-related, analytical tools to the process information. These quality-related, analytical tools include tools that develop the transfer functions, such as those described above, to evaluate and analyze process information through statistical analysis, DOE methodology, and quality control tools. The applied statistical analysis determines process capability, possible process errors, and process management system effectiveness. The applied statistical analysis relies upon information measurement and analysis procedures, tools, equations, and methodology, such as, but not limited to, those described in *Six Sigma Productivity Analysis and Process Characterization*, Mikel J. Harry and J. Ronald Lawson, Addison-Wesley Publishing Co., 1992.

The process management system 1 further provides that the service center 20 be in communication with the machine operator control unit 15, control unit 40, and web site 30 (to be described hereinafter). The service center 20 may also be in communication with the process machine 10, module 13, raw material information data 50, and raw material vendor information 60. The service center 20 may be in communication with these features of the process management system 1 over communications links 11. The service center 20 provides customer service, monitors analyzed information, and can perform further evaluation of the analyzed information, as needed. For example, the analyzed information can be further evaluated for quantifying inventory trends, process trends, and process enhancement.

A process management system 1 benefit arises from the service center 20 being capable of monitoring analyzed information. The service center 20 can then provide customer service, and further monitoring, analyzing, and evaluation of the information for the process management system 1. The service center 20 may notify one or both of the machine operator and process management system owner, if desired, so as to enable interaction and updating, changing or otherwise modifying and controlling the evaluation and analytical operations of the process, in addition to the control of the process machine. Accordingly, the process management system 1 can control the machine and associated process within preset variable ranges, which enhance efficiency of the process machine's operations and product output.

At least one of the machine operator control unit 15, control unit 40, and service center 20 can send alerts to the machine operator and process management system owner if a "critical" event occurs. These critical events include, but are not limited to, extreme energy or raw material shortages or surpluses, process variables that are outside of desired operational ranges, and other such information that may influence the process. The alerts can be sent automatically by each of the machine operator control unit 15, control unit 40, and service center 20, and may also be sent manually. The alerts, which can include updates to previous alerts, are sent by any appropriate communication mode, such as, but not limited to, regular mail, e-mail, telephone call, pages, facsimile, Internet messages, and similar communications.

At least one of the machine operator control unit 15 and the control unit 40 and possibly the service center 20 can apply predictive engineering tools to the analyzed inventory information that will assist plant management in developing transfer functions concerning process management for a process management system 1 benefit. The transfer functions are used to enhance set-up and operation of the components of the process management system 1, such as, but not limited to, the machines, and to further monitor and modify, if needed, performance. The transfer functions are developed through analysis of process operation, critical to quality (CTQ) variables, and other variables in the process management system. For example, the transfer functions for the process management system 1, as embodied by the invention, can be developed through design-of-experiments (DOE).

The process management system 1 will monitor the machine's operation and processes associated with the machine, identify controlling variables and process variable information, promote higher yield and quality through an understanding of process variations on the operation of the machine; and document changes and process improvements. The documentation can be made available to the machine operator via any appropriate communications link 11.

Figure 4:
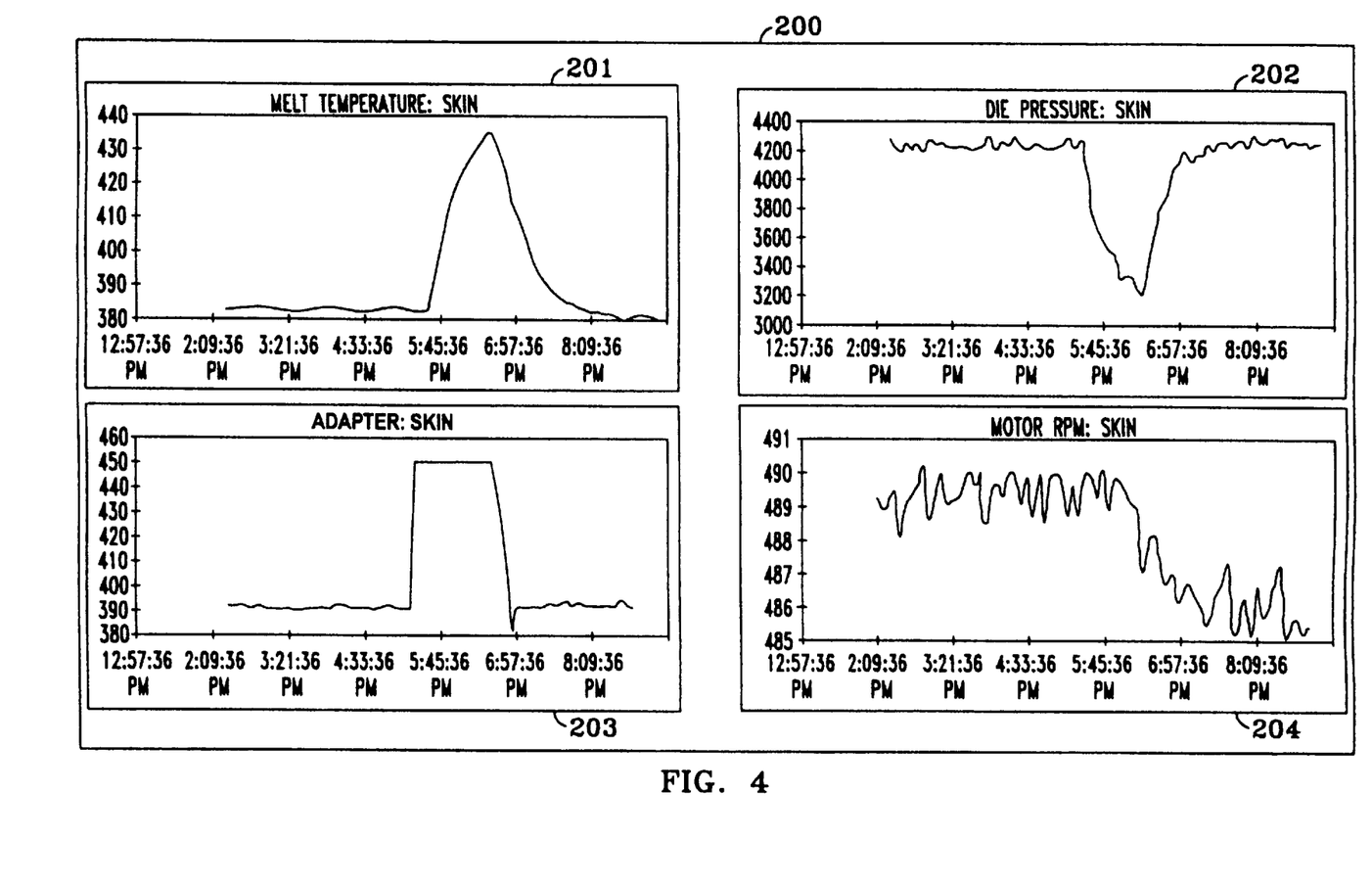
FIG. 4 is an exemplary web page for a process management system, as embodied by the invention.

The process management system 1 may provide its analyzed and evaluated process variable information to the machine operator, process management system, and other parties over a network, such as but not limited to the Internet, a web-based system, or other such information providing mode. The information-providing mode should be able to provide the process variable information on a real-time or near real-time basis. FIG. 4 is an illustration of an exemplary web page 200 that can be produced by the process management system 1, as embodied by the invention. In FIG. 4, the web page can include any number of boxes 201–204, each of which provides at least one process variable as a function of time or another process variable. FIG. 4 illustrates four such boxes of particular process variables, however the number of boxes and the process variables are merely exemplary and are not meant to limit the invention in any manner. The web page 200 is generated at intervals that reflect the operation of the process management system 1. For example, and in no way limiting of the invention, the web page 200 may be generated in real-time so as to permit instantaneous process variables to be shown. Alternatively, the web page 200 may be re-generated (often referred to in the art as "refreshed") at regular time intervals, such as every minute, 30 seconds, or 15 seconds. Alternatively, the web page 200 can be refreshed as desired by the machine operator or the process management system owner.

The process variable information can also be stored by the process management system 1 for archival reasons. Thus, if a party requests production information of a product from the process machine 10 on a certain date and time, the information can be readily and quickly retrieved by the process management system 1. Further, the process variable information can be reviewed for general production trends, such as by quality tools and any related transfer functions, for process variation.

The process management system 1 can further analyze process variable information for minimizing process variations and enhancing process operation conditions. The process management system 1 can include predictive engineering tools, which can enable the definition, development, and implementation of transfer functions and data mining algorithms. Further, predictive engineering tools, transfer functions, and data mining algorithms of the process management system 1 may be used to identify manufacturing limits beyond which defects may be produced, and interpretation of the manufacturing response and variations during production.

While various embodiments are described herein, it will be appreciated from the specification that various combinations of elements, variations or improvements therein may be made by those skilled in the art, and are within the scope of the invention.

We claim:

1. A process management system for at least one of monitoring operation of a machine, controlling operation of the machine, and for analyzing and evaluating machine process variables, the process management system comprising:

at least one sensor assembly that is capable of being disposed on the machine for at least one of sensing, monitoring, and transmitting machine process variables of the machine, the at least one sensor assembly being capable of transmitting signals concerning the machine process variables;

at least one machine operator control unit that is capable of receiving signals transmitted from the at least one sensor assembly, the at least one machine operator control unit being capable of generating information concerning machine process variables;

at least one process management system control unit that is capable of being connected to the at least one machine operator control unit; and at least one communications link that interconnects the at least one sensor assembly on the machine, the at least one machine operator control unit, and the at least one process management system control unit, each communications link capable of enabling the at least one process management system control unit to obtain the information concerning machine process variables;

wherein at least one of the process management system control unit and the machine operator control unit is capable of analyzing and evaluating machine process variables to control the operation of the machine, and wherein operation of the machine is enhanced by users being able to access the analyzed and evaluated machine process variables and use the analyzed and evaluated machine process variables for at least one of: manufacturing planning, process planning, predicting process planning, and process variable planning decision making.

2. A process management system according to claim 1, wherein the at least one communications link comprises a network connection.

3. A process management system according to claim 1, wherein the communications link comprises an Internet connection.

4. A process management system according to claim 1, wherein the communications link comprises at least one of: a phone modem connection, a radio communication connection, a network communication connection, a wireless communication system connections, a cellular communication connection, a satellite communication connection, a web connection, an Internet connection, and combinations thereof.

5. A process management system according to claim 1, wherein at least one of the process management system control unit and the machine operator control unit comprises means for statistically analyzing and evaluating machine process variables.

6. A process management system according to claim 1, wherein the at least one process management system control unit comprises a computer.

7. A process management system according to claim 1, wherein the at least one machine operator control unit comprises a computer.

8. A process management system according to claim 1, wherein the process management system provides real-time machine process variables to at least one of the process management system control unit and the machine operator control unit.

9. A process management system according to claim 1, wherein the process management system provides historical machine process variable characteristics.

10. A process management system according to claim 1, wherein the information concerning machine process variables is automatically generated.

11. A process management system according to claim 10, wherein the information concerning machine process variables is automatically generated at regular intervals.

12. A process management system according to claim 1, wherein the machine process variable information comprises at least one of real-time machine process variable information, historical machine process variable information, and a combination of real-time and historical machine process variable information.

13. A process management system according to claim 1, further comprising at least one of a raw material data source unit, a raw material vendor source unit, and a market information source unit, at least one of the raw material data source unit, the raw material vendor source unit, and the market information source unit being connected to at least one of the process management system control unit and the machine operator control unit to transmit raw material information, raw material vendor information, and market information thereto.

14. A process management system according to claim 1, the process management system further comprising a web site that is capable of displaying the machine process variable information from at least one of the process management system control unit and the machine operator control unit.

15. A process management system according to claim 1, wherein at least one of the process management system control unit and the machine operator control unit is capable of data acquisition, data mining, and data analysis of machine process variables.

16. A process management system according to claim 1, wherein at least one of the process management system control unit and the machine operator control unit is capable of developing and modifying transfer functions.

17. A process management system according to claim 16, wherein the transfer functions can be developed and updated through evaluation and analysis of at least one of machine process variables, product analysis information, and critical to quality (CTQ) variables.

18. A process management system according to claim 16, wherein the transfer functions can be developed and modified through design-of-experiments analysis.

19. A process management system according to claim 16, wherein at least one of the process management system control unit and the machine operator control unit is capable of applying quality-related analytical tools to the machine process variables.

20. A process management system according to claim 1, wherein each sensor assembly is disposed on a component of the machine to sense, monitor, and transmit machine process variables of the component, wherein each sensor assembly can control operation of the respective component to change machine process variables.

21. A process management system according to claim 20, wherein each component is designed to operate in a machine process variable range, the sensor assembly transmits machine process variables to at least one of the process management system control unit and the machine operator control unit, and at least one of the process management system control unit and the machine operator control unit evaluates and analyzes the machine process variables from the sensor assembly and determines if the machine process variables are within the respective machine process variable range.

22. A process management system according to claim 21, wherein if at least one of the process management system and the machine operator control unit evaluates and analyzes the machine process variables from the at least one sensor assembly and determines that the machine process variables are within the machine process variable range, machine operation is continued, and if at least one of the process management system control unit and the machine operator control unit evaluates and analyzes the machine process variables from the sensor assembly and determines that the machine process variables are not within the machine process variable range, at least one of the process management system control unit and the machine operator control unit communicates with the sensor assembly to control the machine process variables of the machine component so the machine process variables are returned to within the machine process variable range.

23. A process management system according to claim 1, wherein the machine comprises an extruder.

24. A process management system according to claim 23, wherein the extruder comprises a foam-forming unit and a skin-forming unit, each of the foam-forming unit and the skin-forming unit comprising a respective sensor assembly.

25. A process management system according to claim 23, wherein the extruder comprises at least one of a receiving chamber, a motive device that moves material into the extruder, units that apply heat to material in the extruder, units that apply or develop pressure on the material in the extruder, a joining chamber that forms an intermediate extruded product material, general-shaping chambers that extrude an intermediate product, a final shaper unit that shapes or cools the extruded product, a final motive device that moves the extruded product from the extruder, and a cutting device for separating the extruded product into desired lengths, wherein each of the at least one receiving chamber, the motive device that moves material into the extruder, the units that apply heat to material in the extruder, the units that apply or develop pressure on the material in the extruder, the joining chamber that forms an intermediate extruder product material, the general-shaping chambers that extrude an intermediate product, the final shaper unit that shapes or cools the extruded product, the final motive device that moves the extruded product from the extruder, and the cutting device for separating the extruded product into desired lengths comprises a respective sensor assembly.

26. An extruder apparatus connected to the process management system of claim 1.

27. A process management system for at least one of monitoring operation of a machine, controlling operation of the machine, and for analyzing and evaluating machine process variables, the process management system comprising:

sensor means disposed on the machine for at least one of sensing, monitoring, and transmitting machine process variables of the machine, the sensor means being capable of transmitting signals concerning the machine process variables;

machine operator control means for receiving signals transmitted from the sensor means, the machine operator control means being capable of generating information concerning machine process variables;

process management system control means for being connected to the machine operator control means; and communications link means for interconnecting the sensor means on the machine, the machine operator control means, and the process management system control means, each communications link means enabling the process management system control means to obtain the information concerning machine process variables; wherein at least one of the process management system control means and the machine operator control means is capable of analyzing and evaluating machine process variables to control the operation of the machine, and wherein operation of the machine is enhanced by users being able to access the analyzed and evaluated machine process variable and use the analyzed and evaluated machine process variables for at least one of: manufacturing planning, process planning, predicting process planning, and process variable planning decision making.

28. A process management system according to claim 27, wherein the communications link means comprises an Internet connection.

29. A process management system according to claim 27, wherein the communications link means comprises at least one of:

a phone modem connection, radio communication connection, a network communication connection, a wireless communication system connections, a cellular communication connection, a satellite communication connection, a web connection, an Internet connection, and combinations thereof.

30. A process management system according to claim 27, wherein the process management system control means comprises a computer.

31. A process management system according to claim 27, wherein the machine operator control means comprises a computer.

32. A process management system according to claim 27, wherein the process management system provides real-time machine process variables to at least one of the process management system control means and the machine operator control means.

33. A process management system according to claim 27, wherein the process management system provides historical machine process variable characteristics.

34. A process management system according to claim 27, wherein the information concerning machine process variables is automatically generated.

35. A process management system according to claim 34, wherein the information concerning machine process variables is automatically generated at regular intervals.

36. A process management system according to claim 27, wherein the machine process variable information comprises at least one of real-time machine process variable information, historical machine process variable information, and a combination of real-time and historical machine process variable information.

37. A process management system according to claim 27, further comprising at least one of a raw material data source unit, a raw material vendor source unit, and a market information source unit, at least one of the raw material data source unit, the raw material vendor source unit, and the market information source unit being connected to at least one of the process management system control means and the machine operator control means to transmit raw material information, raw material vendor information, and market information thereto.

38. A process management system according to claim 27, the process management system further comprising a web site means for displaying the machine process variable information from at least one of the process management system control means and the machine operator control means.

39. A process management system according to claim 27, wherein at least one of the process management system control means and the machine operator control means is capable of data acquisition, data mining, and data analysis of machine process variables.

40. A process management system according to claim 27, wherein at least one of the process management system control means and the machine operator control means is capable of developing and modifying transfer functions.

41. A process management system according to claim 40, wherein the transfer functions can be developed and updated through evaluation and analysis of at least one of machine process variables, product analysis information, and critical to quality (CTQ) variables.

42. A process management system according to claim 40, wherein the transfer functions can be developed and modified through design-of-experiments analysis.

43. A process management system according to claim 27, wherein at least one of the process management system control means and the machine control means is capable of applying quality-related analytical tools to the machine process variables.

44. A process management system according to claim 27, wherein each sensor means is disposed on a component of the machine to sense, monitor, and transmit machine process variables of the component, wherein each sensor means can control operation of the respective component.

45. A process management system according to claim 44, wherein each component is designed to operate in a machine process variable range, the sensor means transmits machine process variables to at least one of the process management system control means and the machine operator control means, and at least one of the process management system control means and the machine operator control means evaluates and analyzes the machine process variables from the sensor means and determines if the machine process variables are within the machine process variable range.

46. A process management system according to claim 45, wherein if at least one of the process management system control means and the machine operator control means evaluates and analyzes the machine process variables from the sensor means and determines that the machine process variables are within the machine process variable range, machine operation is continued, and if at least one of the process management system control means and the machine operator control means evaluates and analyzes the machine process variables from the sensor means and determines that the machine process variables are not within the machine process variable range, at least one of the process management system control means and the machine operator control unit means communicates with the sensor means to control the machine process variables of the machine component so the machine process variables are returned to within the machine process variable range.

47. A process management system according to claim 27, wherein the machine comprises an extruder.

48. A process management system according to claim 47, wherein the extruder comprises a foam-forming unit and a skin-forming unit, each of the foam-forming unit and the skin-forming unit comprising a respective sensor assembly.

49. A process management system according to claim 47, wherein the extruder comprises at least one of a receiving chamber, a motive device that moves material into the extruder, units that apply heat to material in the extruder, units that apply or develop pressure on the material in the extruder, a joining chamber that forms an intermediate extruder product material, general-shaping chambers that extrude an intermediate product, a final shaper unit that shapes or cools the extruded product, a final motive device that moves the extruded product from the extruder, and a cutting device for separating the extruded product into desired lengths, wherein each of the at least one receiving chamber, the motive device that moves material in the extruder, the units that apply heat to material in the extruder, the units that apply or develop pressure on the material in the extruder, the joining chamber that forms an intermediate extruder product material, the general-shaping chambers that extrude an intermediate product, the final shaper unit that shapes or cools the extruded product, the final motive device that moves the extruded product from the extruder, and the cutting device for separating the extruded product into desired lengths comprises a respective sensor assembly.

50. An extruder apparatus connected to the process management system of claim 27.

51. A process management method for at least one of monitoring operation of a machine, controlling operation of the machine, and for analyzing and evaluating machine process variables, the process management method comprising:

disposing at least one sensor assembly on the machine;

sensing, monitoring, and transmitting machine process variables of the machine;

connecting each sensor assembly to a process management system control unit and a machine operator control unit;

receiving signals transmitted from the at least one sensor assembly by at least one of the process management system control unit and the machine operator control unit;

generating information concerning machine process variables by at least one of the process management system control unit and the machine operator control unit; and analyzing and evaluating machine process variables by at least one of the process management system control unit and the machine operator control unit to control the operation of the machine, wherein operation of the machine is enhanced by users being able to access the analyzed and evaluated machine process variables and use the analyzed and evaluated machine process variables for at least one of: manufacturing planning, process planning, predicting process planning, and process variable planning decision making.

52. A process management method according to claim 51, wherein the step of connecting comprises establishing a network connection.

53. A process management method according to claim 51, wherein the step of connecting comprises establishing an Internet connection.

54. A process management method according to claim 51, wherein the step of connecting comprises establishing a communications link over at least one of:

a phone modem connection, radio communication connection, a network communication connection, a wireless communication system connections, a cellular communication connection, a satellite communication connection, a web connection, an Internet connection, and combinations thereof.

55. A process management method according to claim 51, wherein the step of analyzing and evaluating the machine process variables comprises statistically analyzing and evaluating the machine process variables.

56. A process management method according to claim 51, wherein the process management method provides real-time machine process variables.

57. A process management method according to claim 51, wherein the process management method provides historical machine process variable characteristics.

58. A process management method according to claim 51, wherein the information concerning machine process variables is automatically generated.

59. A process management method according to claim 51, wherein the step of generating information concerning machine process variables comprises automatically generating the information concerning machine process variables at regular intervals.

60. A process management method according to claim 51, wherein the machine process variable information comprises at least one of real-time machine process variable information, historical machine process variable information, and a combination of real-time and historical machine process variable information.

61. A process management method according to claim 51, further providing the process management system control unit and the machine operator control unit with at least one of a raw material data source unit, a raw material vendor source unit, and a market information source unit, at least one of the raw material data source unit, the raw material vendor source unit, and the market information source unit being connected to at least one of the process management system control unit and the machine operator control unit to transmit raw material information, raw material vendor information, and market information thereto.

62. A process management method according to claim 51, further comprising the step of displaying machine process variable information on a web site.

63. A process management method according to claim 51, wherein the step of analyzing and evaluating the machine process variables comprises at least one of data acquisition, data mining, and data analysis.

64. A process management method according to claim 51, wherein the step of analyzing and evaluating the machine process variables further comprises developing and modifying transfer functions.

65. A process management method according to claim 64, wherein the step of developing and modifying transfer functions comprises developing and updating transfer functions through evaluation and analysis of at least one of machine process variables, product analysis information, and critical to quality (CTQ) variables.

66. A process management method according to claim 64, wherein the step of developing and modifying transfer functions comprises developing and modifying the transfer functions through design-of-experiments analysis.

67. A process management method according to claim 51, wherein the step of developing and modifying transfer functions comprises applying quality-related analytical tools to the machine process variables.

68. A process management method according to claim 51, further comprising the step of controlling operation of a component of the machine upon which a sensor assembly is disposed, the step of controlling comprising sensing, monitoring, and transmitting machine process variables from the sensor assembly, wherein each sensor assembly can control operation of the respective component to change machine process variables.

69. A process management method according to claim 68, wherein each component is designed to operate in a machine process variable range, and the sensor assembly transmits machine process variables to at least one of the process management system control unit and the machine operator control unit, and at least one of the process management system control unit and the machine operator control unit evaluates and analyzes the machine process variables from the sensor assembly and determines if the machine process variables are within the machine process variable range.

70. A process management method according to claim 51, wherein if at least one of the process management system control unit and the machine operator control unit evaluates and analyzes the machine process variables from the sensor assembly and determines that the machine process variables are within the machine process variable range, machine operation is continued, and if at least one of the process management system control unit and the machine operator control unit evaluates and analyzes the machine process variables from the sensor assembly and determines that the machine process variables are not within the machine process variable range, at least one of the process management system control unit and the machine operator control unit communicates with the sensor assembly to control the machine process variables of the machine component so the machine process variables are returned to within the machine process variable range.

71. A process management method according to claim 51, wherein the machine comprises an extruder.

72. A process management method according to claim 71, wherein the extruder comprises a foam-forming unit and a skin-forming unit, each of the foam-forming unit and the skin-forming unit comprising a respective sensor assembly.

73. A process management method according to claim 72, wherein the extruder comprises at least one of a receiving chamber, a motive device that moves material into the extruder, units that apply heat to material in the extruder, units that apply or develop pressure on the material in the extruder, a joining chamber that forms an intermediate extruder product material, general-shaping chambers that extrude an intermediate product, a final shaper unit that shapes or cools the extruded product, a final motive device that moves the extruded product from the extruder, and a cutting device for separating the extruded product into desired lengths, wherein each of the at least one receiving chamber, the motive device that moves material in the extruder, the units that apply heat to material in the extruder, the units that apply or develop pressure on the material in the extruder, the joining chamber that forms an intermediate extruder product material, the general-shaping chambers that extrude an intermediate product, the final shaper unit that shapes or cools the extruded product, the final motive device that moves the extruded product from the extruder, and the cutting device for separating the extruded product into desired lengths comprises a respective sensor assembly.

74. A method for doing business comprising the process management method of claim 51.

75. A business method for providing a business service comprising the process management method of claim 51.

* * * * *

UNITED STATES PATENT AND TRADEMARK OFFICE
CERTIFICATE OF CORRECTION

PATENT NO.   : 6,496,751 B1
DATED        : December 17, 2002
INVENTOR(S)  : Salvo et al.

It is certified that error appears in the above-identified patent and that said Letters Patent is hereby corrected as shown below:

Column 5,
Line 35, after "analog/digital" delete "(AID)" and insert therefor -- (A/D) --

Column 11,
Line 48, after "management" delete "system 1;" and insert therefor -- system 1, --

Column 14,
Line 67, after "experiments" delete "(DOE)" and insert therefor -- (DOEs) --

Signed and Sealed this

Twenty-eighth Day of December, 2004

JON W. DUDAS
*Director of the United States Patent and Trademark Office*